United States Patent [19]
Moulton

[11] Patent Number: 6,019,144
[45] Date of Patent: Feb. 1, 2000

[54] APPARATUS AND METHOD FOR APPLYING MATERIAL TO A SUBSTRATE

[75] Inventor: Russell D. Moulton, San Jose, Calif.

[73] Assignee: Valence Technology, Inc., San Jose, Calif.

[21] Appl. No.: 08/077,002

[22] Filed: Aug. 6, 1993

[51] Int. Cl.[7] ................................................. H01M 4/20
[52] U.S. Cl. .............................. 141/1.1; 141/32; 141/33; 141/82; 29/2; 29/623.1
[58] Field of Search .................................. 141/1.1, 32, 33, 141/69, 82; 29/2, 623.1, 623.3, 623.5

[56] References Cited

U.S. PATENT DOCUMENTS

| | | | |
|---|---|---|---|
| 3,758,340 | 9/1973 | Adams | 141/1.1 |
| 3,951,688 | 4/1976 | Pankow et al. | 141/1.1 |
| 4,342,343 | 8/1982 | Clague et al. | 141/1.1 |
| 4,499,929 | 2/1985 | Shima et al. | 141/1.2 |
| 4,830,939 | 5/1989 | Lee et al. | |
| 4,925,751 | 5/1990 | Shackle et al. | |
| 5,146,958 | 9/1992 | Bugnet et al. | 141/1.1 |

FOREIGN PATENT DOCUMENTS 0195872  10/1985  Japan ...................................... 141/1.1

*Primary Examiner*—Ernest G. Cusick
*Attorney, Agent, or Firm*—Robert Krebs

[57] ABSTRACT

In a system for applying material to a substrate, a first material is applied to the substrate and the substrate coated with the first material is drawn between a pair of rollers to form a material layer. The roller which contacts the first material is grounded and an electrostatic charging device sprays electrostatically charged particles of a second material onto the roller such that the particles are evenly dispersed on the surface of the roller. The particles of the second material on the roller tend to prevent the first material from adhering to the roller and are preferably incorporated into the second material.

17 Claims, 2 Drawing Sheets

APPARATUS AND METHOD FOR APPLYING MATERIAL TO A SUBSTRATE

BACKGROUND OF THE INVENTION

1. Field of the Invention

The present invention relates to apparatuses and methods for applying material to a substrate and, for preventing applied material from adhering to processing equipment.

2. State of the art

In recent years, workers in the battery art have begun to understand and recognize the advantages of "laminate" batteries including solid polymer electrolytes and sheet-like anodes and cathodes. The advantages include lower battery weights than conventional batteries that employ liquid electrolytes, longer service life, relatively high power densities, relatively high specific energies, and the elimination of the danger associated with batteries containing spillable liquid electrolytes such as acids.

Laminate batteries using polymer electrolytes have been developed which possess good performance characteristics. For example, in U.S. Pat. No. 4,925,751, a laminate battery in which a cathode material formed from a mixture of an active cathodic material (preferably the vanadium oxide compound $V_6O_{13}$), a conductive filler material (preferably carbon particles or filaments), and an ionically conductive polymer electrolyte material is laminated on a conductive substrate material such as a continuous sheet of aluminum or nickel. A layer of polymer electrolyte material is laminated over the laminated layer of cathode material, and an anode material is applied over the laminated layer of polymer electrolyte material.

The cathode material typically has a viscosity on the order of about 900,000 centipoise at 200 $\sec^{-1}$. The application of the cathode material onto the substrate is generally performed through an extrusion process in which a bead of cathode material is extruded onto the substrate, and the substrate and the extruded cathode material are compressed between a pair of polished pressing rollers to form a cathode material layer. Formation of an even thickness layer is difficult, in part because of the tendency of the uncured cathode material to adhere to any surface with which it comes into contact, particularly the rollers for forming the cathode layer on the substrate. Further, in handling the substrate coated with uncured cathode material at subsequent processing points, such as at cathode layer smoothing devices, the cathode material tends to adhere to the subsequent processing equipment.

In attempting to minimize problems associated with cathode material adhering to processing equipment, various solutions have been proposed. Typically, the cathode material layer formed on a substrate is cured after formation of the cathode material layer by the pressing rollers. While curing the cathode material layer after its formation by the pressing rollers reduces adherence of cathode material to subsequent processing equipment, it does not prevent cathode material from adhering to the pressing rollers for forming the cathode material layer, which must be positioned before any curing apparatus. Further, when the cathode material layer is cured prior to application of the electrolyte material layer, it is necessary to provide a second curing step for curing the electrolyte material layer. It is, therefore, desirable to provide an apparatus and method for applying cathode material to a substrate in which cathode material is prevented from adhering to pressing rollers and in which only one curing step is necessitated in a process for forming a laminate including a cathode material layer and an electrolyte material layer.

Copending U.S. patent application Ser. No. 08/078,940 (corresponding to Valence Technology, Inc., I.D. No. 1107) describes one technique for minimizing problems associated with cathode material adhering to surfaces. A web of material, such as Mylar, is wound around the one of the pressing rollers that presses against the bead of uncured cathode material. When cathode material is extruded onto the substrate, the cathode material is squeezed by the pressing rollers between the substrate and the continuous web, rather than being in direct contact with one of the rollers. The web, or "release layer", is later peeled away from the cathode material layer. This method and apparatus prevents buildup of cathode material on the pressing rollers, and the web is preferably a highly smooth material which has a lesser tendency to permit cathode material to adhere to it than the polished pressing roller. However, it has been observed that the cathode material nonetheless tends to adhere to the release layer when it is peeled away and thus causes an imperfectly smooth cathode material layer. Further, the release layer has been known to carry impurities that affect the quality of the cathode material layer.

Copending U.S. patent application Ser. No. 07/968,370 (corresponding to Valence Technology, Inc., I.D. No. 1106) describes another technique for preventing adherence of cathode material to processing equipment including pressing rollers. Chilled rollers are used in forming and smoothing the cathode material layer. The temperature of the rollers is such that the cathode material tends to become set or cast, although not cured, so that it will not adhere to the chilled rollers. Unfortunately, this technique is also only partially successful, in that there is still some tendency for the cathode material to adhere to the chilled rollers. Accordingly, it is desirable to provide a method and apparatus for forming and processing a web coated with a cathode material layer which minimizes the tendency of cathode material to adhere to the layer forming and processing equipment.

SUMMARY OF THE INVENTION

The present invention generally provides an apparatus for forming an electrode material layer on a substrate where the electrode material is formed from a mixture of one or more materials. In practice, a contacting means is grounded and an applying mechanism includes a means for electrostatically charging the powder such that it is evenly dispersed on an electrode material contacting surface of the contacting means.

Further, the present invention provides a method for forming an electrode material layer on a substrate where the electrode material is a mixture of one or more materials and is applied on the substrate with a contacting mechanism. Again, the powder is formed from one or more of the materials forming the electrode material. Further according to the method, the powder is applied to the contacting means such that the electrode material is prevented from adhering to the contacting means. The powder can be applied by, for instance, electrostatically charging it and then grounding the contacting means such that the powder is attracted to and evenly dispersed over the contacting means.

BRIEF DESCRIPTION OF THE DRAWINGS

The present invention can be further understood with reference to the following description in conjunction with the appended drawings, wherein like elements are provided with the same reference numerals.

DETAILED DESCRIPTION OF THE PREFERRED EMBODIMENTS

Figure 1:
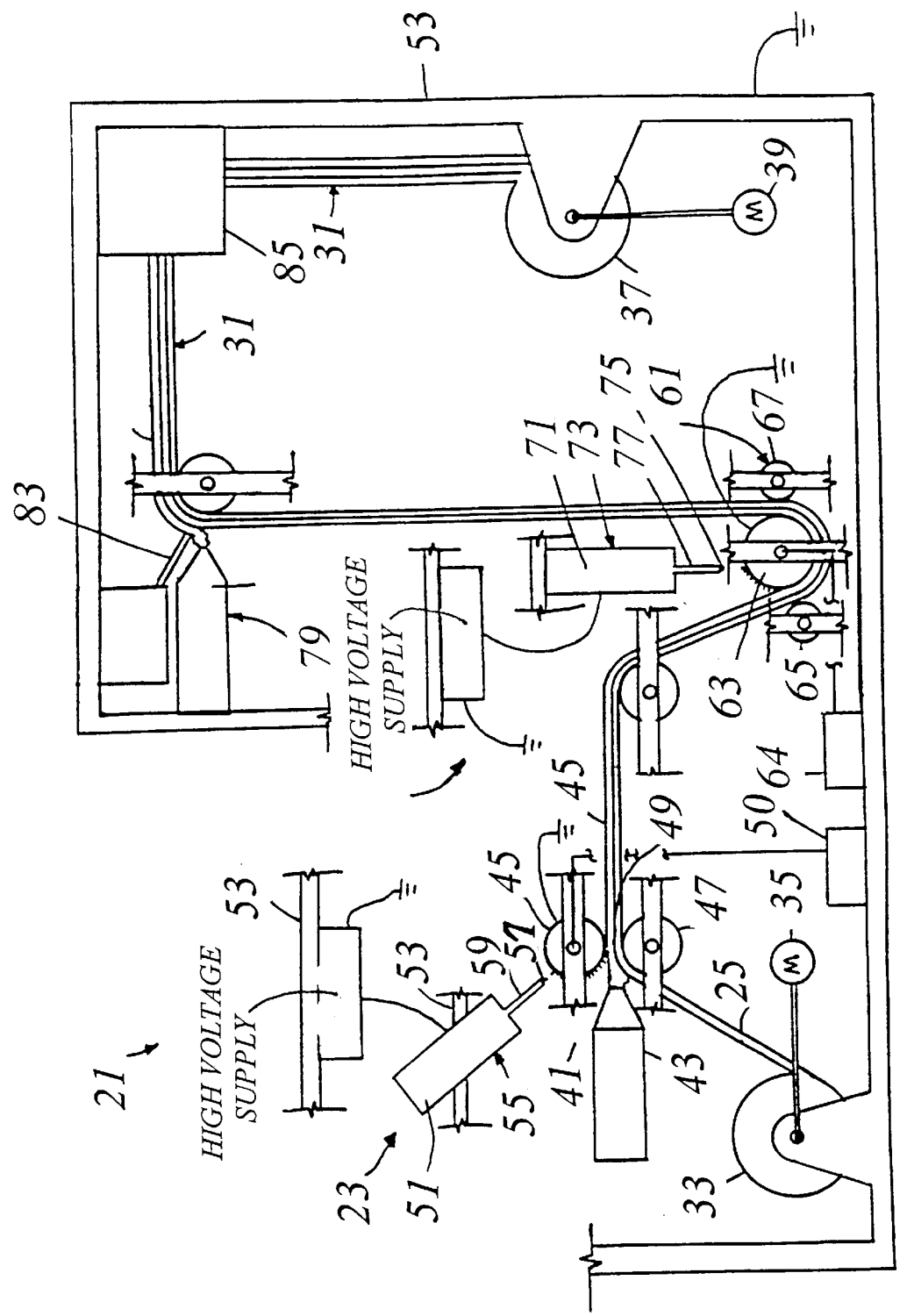
FIG. 1 is a side, partial cross-sectional, schematic view of an apparatus for forming a portion of a battery including a device for preventing electrode material from adhering to processing equipment according to a first embodiment of the present invention.

With reference to FIG. 1, an apparatus 21 for forming a portion of a battery, including a device 23 for preventing electrode material from adhering to processing equipment, is shown. In the apparatus 21, a substrate material 25 is coated with a layer of electrode material 27 and the electrode material layer is coated with a layer of electrolyte material 29 to form a web 31. After formation of the web 31 in the apparatus 21, a second substrate material coated with a material layer having a different electromotive potential than the electrode material layer 27 is positioned relative to the web 31 so that the electrolyte material layer 29 is disposed between the electrode material layer and the different electrode material layer, thereby forming a battery.

In accordance with a presently preferred embodiment, the substrate material 25 is a continuous web or sheet of material such as a aluminum or nickel. Further in accordance with a presently preferred embodiment, the material for forming the electrode material layer 27 is a paste-like, curable cathode material including vanadium oxide such as $V_6O_{13}$, a conductive filler material (preferably carbon particles or filaments), and an ionically conductive polymer electrolyte material. U.S. Pat. No. 4,925,751 describes certain materials useful in forming paste-like cathode materials, anode materials, substrate materials, and electrolyte materials and is incorporated by reference to the extent that such materials are described.

In the apparatus 21 shown in FIG. 1, the substrate 25 is unwound from a first roller 33. A device 35 for rotating the first roller 33 at a desired speed is preferably provided, such as a variable speed electric motor. After the substrate 25 is coated with the electrode material 27 and the electrolyte material 29, the web 31 is preferably rewound onto a second roller 37, also provided with a device 39 for rotating the second roller, such as a variable speed electric motor. The variable speed electric motors 35, 39 are preferably operated at speeds such that tension in the substrate 25 is maintained at between 3–5 lbs/inch width of the substrate.

The substrate 25 is drawn through an apparatus 41 for forming the electrode material layer 27 on the substrate. The apparatus 41 includes an electrode material extruder 43 which extrudes electrode material onto the substrate 25. The electrode material extruder 43 preferably extrudes electrode material onto the substrate in the form of a bead. The apparatus 41 further includes a pair of electrode material layer forming rollers 45, 47 between which the substrate material 25 and the electrode material applied thereon are drawn so that the electrode material is compressed to form the electrode material layer 27.

Pressure in the nip 49 of the electrode material layer forming rollers 45, 47 is preferably adjustable to adjust the thickness of the electrode material layer 27. An apparatus and method for adjusting pressure between two rollers suitable for use in the apparatus 41 is described in U.S. patent application Ser. No. 08/049,489 (corresponding to Valence Technology, Inc., I.D. No. 1105), the disclosure of which is incorporated by reference to the extent that it describes such an apparatus. Preferably, one or both of the electrode material layer forming rollers 45, 47 include hollow interiors and are chilled by a chilling apparatus 50 which circulates chilled liquid through the rollers to minimize adherence of electrode material to the rollers. A chilled roller apparatus adaptable for use in forming an electrode material layer is described in U.S. patent application Ser. No. 07/968,370 (corresponding to Valence Technology, Inc., I.D. No. 1106), the disclosure of which is incorporated to the extent that it describes such an apparatus.

The device 23 prevents electrode material from adhering to the electrode material layer forming roller 45, which normally presses against the electrode material as the substrate 25 coated with electrode material passes through the nip 49 between the electrode material layer forming rollers 45, 47. The device 23 supplies a material from a source of material 51, i.e., a reservoir, onto the roller 45. The material is preferably in dry form so that it forms a barrier layer of dry material between the paste-like electrode material and electrode material layer 27 formed therefrom and the electrode material layer forming roller 45, thereby tending to prevent the paste-like electrode material from adhering to the electrode material layer forming roller. The material prevents the electrode material from adhering to the electrode material layer forming roller 45 in much the same way that flouring a surface prevents dough from sticking to the surface. The material is a material adapted to non-destructively adhere to or become incorporated in the electrode material layer 27. In accordance with the presently preferred embodiment, the material is one of the materials for forming a cathode material layer, preferably vanadium oxide.

The electrode material layer forming roller 45 is preferably grounded to earth potential. Ordinarily, the electrode material layer forming roller 45 is mounted on a frame assembly 53 at ground potential that serves to ground the roller. The device 23 preferably includes a spray device 55 through which the material from the source of material 51 is sprayed. The spray device 55 preferably includes a corona point 57 at the end of a nozzle 59 of the spray device for electrostatically charging the material so that the electrostatically charged material is evenly dispersed over at least a portion of the surface of the grounded electrode material layer forming roller 45. When the paste-like electrode material on the substrate 25 passes between the electrode material layer forming roller 45 coated with the electrostatically charged material and the electrode material layer forming roller 47, the material tends to prevent the electrode material from adhering to the roller 45 by forming a barrier layer between the paste-like electrode material and electrode material layer formed therefrom and the roller. Some or all of the electrostatically charged material is incorporated into the paste-like electrode material as the electrode material on the substrate 25 is compressed in the nip 49 to form the electrode material layer 27. The material is applied onto the electrode material layer forming roller 45 in quantities such that the thickness of the electrode material layer 27 is not appreciably altered by incorporation of some or all of the material into the electrode material layer.

After the electrode material layer 27 is formed on the substrate 25, the electrode material layer 27 is preferably further smoothed in a smoothing apparatus 61 including a highly polished main smoothing roller 63 and one or more smoothing rollers 65, 67 for pressing the electrode material layer 27 against the main smoothing roller. U.S. patent application Ser. No. 07/968,370 (corresponding to Valence Technology, Inc., I.D. No. 1106), incorporated by reference above in connection with its description of a chilled roller, describes an apparatus and method for smoothing the electrode material layer 27 and is incorporated by reference to the extent that it describes such a method and apparatus. The main smoothing roller 63 is preferably hollow and is chilled by a chilling apparatus 64 which circulates chilled liquid through the smoothing roller to minimize adherence of electrode material to the main smoothing roller.

A device 69 prevents adherence of electrode material forming the electrode material layer 27 to the main smoothing roller 63 in a manner similar to the manner in which the device 23 prevents adherence of electrode material to the electrode material layer forming roller 45. Material from a source of material 71 is preferably dispensed by a spray device 73 with a corona point 75 at the end of a nozzle 77 of the spray device. The spray device 73 preferably sprays electrostatically charged material, preferably vanadium oxide, onto the main smoothing roller 63, which is grounded, so that the electrostatically charged material is evenly dispersed over at least a portion of the exterior of the main roller. The electrostatically charged material tends to prevent the electrode material layer 27 from adhering to the main smoothing roller 63 by forming a barrier layer between the paste-like electrode material layer and the main smoothing roller. Some or all of the electrostatically charged material is incorporated into the electrode material layer 27 as the substrate 25 coated with the electrode material layer is drawn through the roller nips defined by the main smoothing roller 63 and the smoothing rollers 65, 67. Again, the material is applied in quantities such that the thickness of the electrode material layer 27 is not appreciably altered by incorporation of some or all of the material into the electrode material layer.

The substrate 25 coated with the electrode material layer 27 is drawn through an electrolyte material layer applying apparatus 79. The electrolyte material layer applying apparatus 79 includes an electrolyte material extruder apparatus 81 which extrudes electrolyte material onto the electrode material layer 27 and a device for forming the electrolyte material layer 29, such as a doctor blade assembly 83. An electrolyte material layer applying apparatus 79 suitable for use in the apparatus 21 is described in U.S. patent application Ser. No. 08/049,785 (corresponding to Valence Technology, Inc., I.D. No. 1108), the disclosure of which is incorporated by reference to the extent that it describes such an apparatus.

The web 31, which includes the substrate 25, the electrode material layer 27, and the electrolyte material layer 29, is preferably drawn through a single curing apparatus 85 for curing the electrode material layer and the electrolyte material layer together. If desired, however, separate curing apparatuses may be provided for curing the electrode material layer 27 prior to application of the electrolyte material layer 29 and for curing the electrolyte material layer after its application by the electrolyte material layer applying apparatus 79. The curing apparatus 85 is preferably an electron beam curing apparatus.

Figure 2:
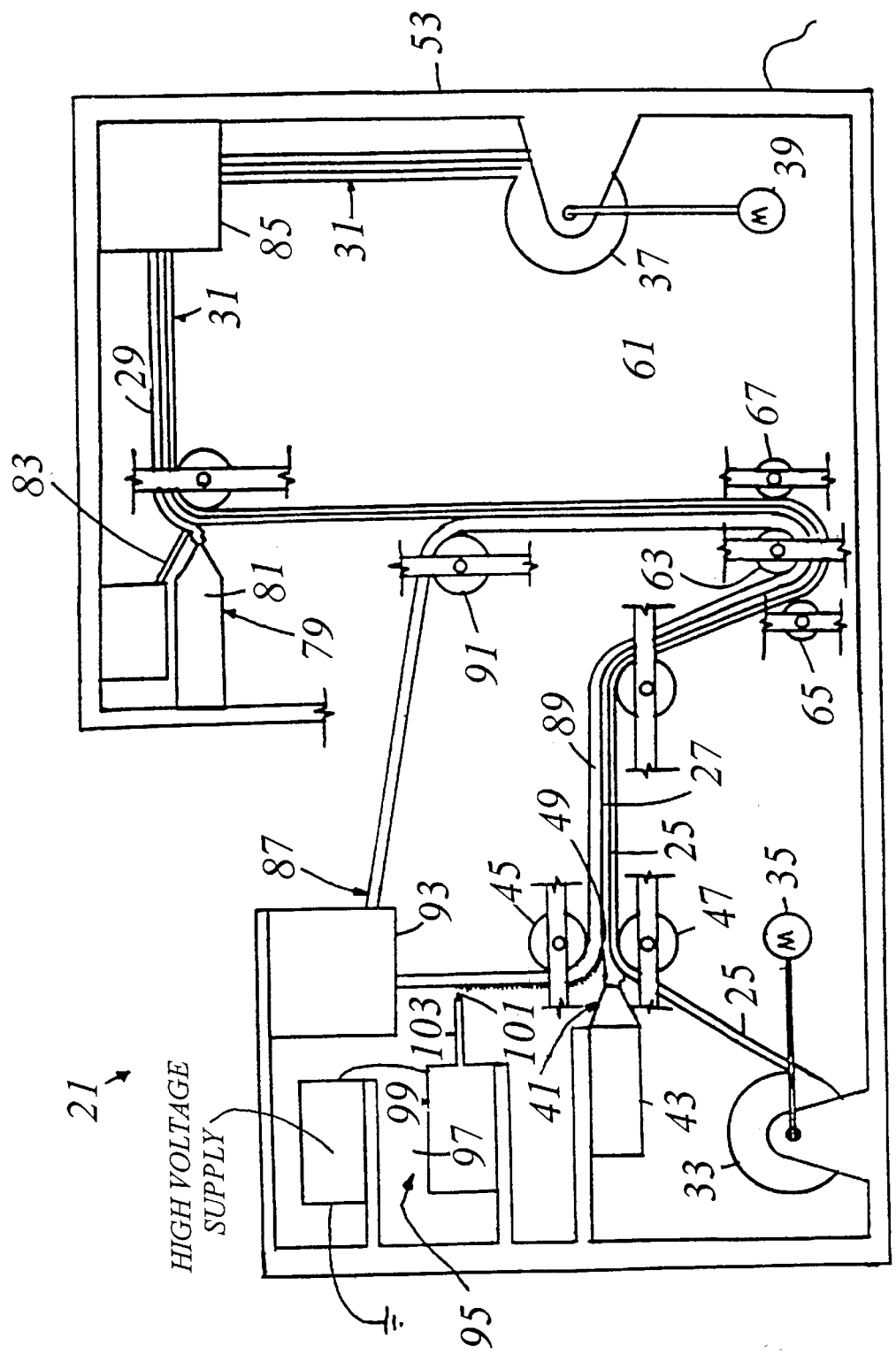
FIG. 2 is a side, partial cross-sectional, schematic view of an apparatus for forming a portion of a battery including a device for preventing electrode material from adhering to processing equipment according to a second embodiment of the present invention.

In another embodiment, as shown in FIG. 2, the apparatus 21 is provided with a system 93 for interposing a release material 89 adjacent the electrode material and the electrode material layer 27. The electrode material and the electrode material layer 27 contact the release material 89 as the electrode material and the electrode material layer on the substrate 25 are drawn through roller nip 49 between the electrode material layer forming rollers 45, 47 and the nips between the main smoothing roller 63 and the smoothing rollers 65, 67. The release material 89 is preferably a material such as Mylar. The release material 89 is formed of a material to which the electrode material and the electrode material layer 27 tend not to adhere.

The release material 89 is preferably in the form of sheet which is interposed between the electrode material and the electrode material layer 27 and the electrode material layer forming roller 45, and between the electrode material layer and the main smoothing roller 63. As the electrode material and the electrode material layer 27 and the substrate 25 are pressed between the electrode material layer forming rollers 45, 47 and the smoothing rollers 63, 65, and 67, the electrode material and the electrode material layer are in contact with the release material, and not the rollers, thereby preventing adherence of the electrode material and the electrode material layer to the rollers.

After the substrate 25 and the electrode material layer 27 have been drawn past the main smoothing roller 63, the release material 89 is redirected by a redirecting roller 91 so that it is peeled away from the electrode material layer. The release material 89 is then usually discarded, as indicated by arrow 87.

A device 95 prevents adherence of electrode material forming the electrode material layer 27 to the release material 89 in a manner similar to the manner in which the devices 23, 69 prevent adherence of electrode material and the electrode material layer to the electrode material layer forming roller 45 and the main smoothing roller 63. Material from a source of material 97 is preferably dispensed by a spray device 99, the spray device having a corona point 101 at the end of a nozzle 103, so that the spray device sprays electrostatically charged material, preferably vanadium oxide, onto at least a portion of the grounded release material 89 so that the electrostatically charged material is evenly dispersed over the side of the release material that contacts the electrode material and the electrode material layer 27. The electrostatically charged material tends to prevent the electrode material layer 27 from adhering to the release material by forming a barrier layer between the paste-like electrode material and electrode material layer formed therefrom and the release material 89. Some or all of the electrostatically charged material is incorporated into the electrode material layer 27 as the substrate 25 coated with the electrode material layer is drawn through the roller nips such as the nip 49 between the electrode material layer forming rollers 45, 47 and the nips between the main smoothing roller 63 and the rollers 65, 67 which press against the main smoothing roller. Again, the material is applied in quantities such that the thickness of the electrode material layer 27 is not appreciably altered by incorporation of some or all of the material into the electrode material layer.

The cured web 31 is preferably wound onto the roller 37. The cured web 31 is adapted to be further processed to form a battery (not shown). The cured web 31 is formed into a battery by further processes in which an electrode, generally in sheet form, having an electromotive potential different from that of the electrode material layer 27 is positioned on the electrolyte material layer 29. The battery so formed is preferably formed into a desired product shape by further process steps involving folding and cutting of the web 31 and the sheet-like electrode having a different electromotive potential than the electrode material layer 27.

The foregoing has described the principles, preferred embodiments and modes of operation of the present invention. However, the invention should not be construed as limited to the particular embodiments discussed. Instead, the above-described embodiments should be regarded as illustrative rather than restrictive, and it should be appreciated that variations may be made in those embodiments by workers skilled in the art without departing from the scope of present invention as defined by the following claims.

What is claimed is:

1. A method for forming an electrode material layer on a substrate, comprising:

applying electrode material onto a substrate, the electrode material being a mixture of one or more materials;

contacting the electrode material applied on the substrate with contacting means;

applying a powder to the contacting means such that the electrode material is prevented from adhering to the contacting means, the powder being formed from one or more of the materials forming the electrode material.

2. The method of claim 1 wherein the powder is applied to the contacting means by electrostatically charging the powder and grounding the contacting means such that the powder is dispersed on the contacting means.

3. The method of claim 1 wherein the electrode material applied on the substrate is contacted by a roller.

4. The method of claim 1 comprising the further step of chilling the roller to a predetermined temperature.

5. The method of claim 4, wherein the electrode material is contacted by a release material.

6. The method of claim 4 wherein the electrode material further includes a conductive filler material, and an ionically conductive polymer electrolyte material.

7. An apparatus for forming an electrode material layer on a substrate, comprising:

means for applying electrode material onto a substrate, the electrode material being formed from a mixture of one or more materials;

means for contacting the electrode material applied on the substrate;

means for applying a powder to the contacting means such that the electrode material is prevented from adhering to the contacting means, the powder being formed from one or more of the materials forming the electrode material.

8. The apparatus of claim 7, wherein the contacting means is grounded and the applying means includes a means for electrostatically charging the powder such that the powder is dispersed on an electrode material contacting surface of the contacting means.

9. The apparatus of claim 7, wherein the contacting means includes a roller for pressing the electrode material applied on the substrate.

10. The apparatus of claim 9, wherein the roller is a pressing roller for pressing the electrode material applied on the substrate such that an electrode material layer is formed.

11. The apparatus of claim 9, wherein the roller is a pressing roller for pressing an electrode material layer formed on the substrate such that the electrode material layer is smoothed.

12. The apparatus of claim 9, wherein the roller is chilled to a predetermined temperature.

13. The apparatus of claim 7, wherein the contacting means includes a release material for being pressed against the electrode material applied on the substrate.

14. The apparatus of claim 7, wherein the contacting means includes a release material web for being pressed against the electrode material applied on the substrate.

15. The apparatus of claim 7, wherein the electrode material includes vanadium oxide.

16. The apparatus of claim 15, wherein the vanadium oxide is primarily $V_6O_{13}$.

17. The apparatus of claim 15, wherein the electrode material further includes an electrically conductive filler material, and an ionically conductive polymer electrolyte material.

* * * * *